United States Patent
Griffis

(10) Patent No.: US 12,493,989 B2
(45) Date of Patent: Dec. 9, 2025

(54) THERMAL CAMERA DAISY CHAIN

(71) Applicant: Delta Thermal, Inc., Tucson, AZ (US)

(72) Inventor: Andrew Griffis, Tucson, AZ (US)

(73) Assignee: Delta Thermal, Inc., Tucson, AZ (US)

( * ) Notice: Subject to any disclaimer, the term of this patent is extended or adjusted under 35 U.S.C. 154(b) by 8 days.

(21) Appl. No.: 18/490,044

(22) Filed: Oct. 19, 2023

(65) Prior Publication Data

US 2024/0046519 A1     Feb. 8, 2024

Related U.S. Application Data

(63) Continuation-in-part of application No. 17/237,032, filed on Apr. 21, 2021, now Pat. No. 11,832,025, which is a continuation-in-part of application No. 16/779,622, filed on Feb. 2, 2020, now Pat. No. 10,991,217.

(Continued)

(51) Int. Cl.
| | |
|---|---|
| *G06T 7/80* | (2017.01) |
| *G06T 5/10* | (2006.01) |
| *G06T 5/80* | (2024.01) |
| *H04N 23/11* | (2023.01) |
| *H04N 23/84* | (2023.01) |

(52) U.S. Cl.
CPC .................. *G06T 7/80* (2017.01); *G06T 5/10* (2013.01); *G06T 5/80* (2024.01); *H04N 23/11* (2023.01); *H04N 23/84* (2023.01); *G06T 2207/10024* (2013.01); *G06T 2207/10048* (2013.01); *G06T 2207/20048* (2013.01)

(58) Field of Classification Search
None
See application file for complete search history.

(56) References Cited

U.S. PATENT DOCUMENTS 9,365,223 B2    6/2016   Martin et al.
9,685,065 B2    6/2017   Diels
(Continued)

FOREIGN PATENT DOCUMENTS

WO     2012/006605 A2     1/2012

OTHER PUBLICATIONS

Mohamed et al., "Partial Discharge Detection and Localization: Using Software-Defined Radio", IEEE Industrial Electronics Magazine, vol. 13, Issue 4, Dec. 23, 2019, pp. 77-85.
(Continued)

*Primary Examiner* — Eileen M Adams
(74) *Attorney, Agent, or Firm* — NGUYEN TARBET IP LAW

(57) ABSTRACT

A thermal camera system configured for Red-Green-Blue (RGB) to thermal image mapping and calibration of a thermal camera. The system may comprise a plurality of thermal cameras connected in a daisy-chain formation, and a computing device communicatively coupled to the base thermal camera. The computing device configured to accept a distorted RGB image, convert it into an array image, undistort the array image into an undistorted RGB image through use of a barrel transformation, map each corner element of the plurality of corner elements to a predefined coordinate to generate a thermal angular mapping, and map the thermal angular mapping to a distorted thermal image by a 2nd-degree parabola mapping process.

15 Claims, 6 Drawing Sheets

Related U.S. Application Data

(60) Provisional application No. 63/013,081, filed on Apr. 21, 2020.

(56) References Cited

U.S. PATENT DOCUMENTS

| | | | |
|---|---|---|---|
| 9,857,272 | B2 | 1/2018 | Summers et al. |
| 10,005,317 | B2 | 6/2018 | Biderman et al. |
| 10,122,969 | B1* | 11/2018 | Lim .................. G06T 7/11 |
| 10,796,403 | B2 | 10/2020 | Choi et al. |
| 10,991,217 | B2 | 4/2021 | Griffis |
| 11,068,679 | B2 | 7/2021 | Rodriguez et al. |
| 11,832,025 | B2 | 11/2023 | Griffis |
| 2006/0222278 | A1 | 10/2006 | Singh et al. |
| 2009/0136099 | A1* | 5/2009 | Boyden .............. G06T 7/0012 382/128 |
| 2011/0301873 | A1 | 12/2011 | Cocconcelli et al. |
| 2014/0114555 | A1 | 4/2014 | Lagassey |
| 2015/0035961 | A1* | 2/2015 | Chen .................. H04N 23/21 348/77 |
| 2015/0168864 | A1 | 6/2015 | Herloski |
| 2016/0196653 | A1* | 7/2016 | Grant .................. H04N 23/45 382/294 |
| 2016/0313442 | A1 | 10/2016 | Ho et al. |
| 2017/0337700 | A1* | 11/2017 | Wilson .................. G06T 7/262 |
| 2017/0370775 | A1 | 12/2017 | Kusukame et al. |
| 2018/0035084 | A1 | 2/2018 | Swiss et al. |
| 2018/0149949 | A1 | 5/2018 | Kim et al. |
| 2019/0038365 | A1* | 2/2019 | Soper .................. A61B 6/12 |
| 2019/0310137 | A1 | 10/2019 | Pop |
| 2020/0041348 | A1* | 2/2020 | Kusukame .............. G01J 5/07 |
| 2020/0134939 | A1 | 4/2020 | Schell et al. |
| 2020/0224460 | A1 | 7/2020 | Miller et al. |
| 2020/0242737 | A1* | 7/2020 | Stan .................. H04N 9/643 |
| 2023/0035869 | A1 | 2/2023 | Martin |

OTHER PUBLICATIONS

USPTO, "Non-Final Office Action" issued in connection with U.S. Appl. No. 16/779,622, dated Oct. 8, 2020, 20 pages.

USPTO, "Non-Final Office Action" issued in connection with U.S. Appl. No. 17/237,032, dated Jan. 10, 2023, 17 pages.

WIPO, "International Search Report and Written Opinion" issued in connection with PCT Patent Application PCT/US2024/051276, dated Jan. 14, 2025, 12 pages.

Gong et al. "Self-Powered Wireless Sensor Node for Smart Railway Axle Box Bearing via a Variable Reluctance Energy Harvesting System", IEEE Transactions on Instrumentation and Measurement, vol. 70, 2021, 11 pages.

Bernal et al. "Onboard Condition Monitoring Sensors, Systems and Techniques for Freight Railway Vehicles: A Review", IEEE Sensors Journal, vol. 19, No. 1, Jan. 1, 2019, pp. 4-24.

Dziadak et al. "Powering the WSN Node for Monitoring Rail Car Parameters, Using a Piezoelectric Energy Harvester", Energies, vol. 15, No. 1641, Feb. 23, 2022, pp. 1-18.

USPTO, "Notice of Allowance" issued in connection with U.S. Appl. No. 18/913,956, dated Jan. 15, 2025, 13 pages.

* cited by examiner

THERMAL CAMERA DAISY CHAIN

CROSS-REFERENCES TO RELATED APPLICATIONS

This application is a continuation-in-part and claims benefit of U.S. patent application Ser. No. 17/237,032, filed Apr. 21, 2021, which is a non-provisional and claims benefit of U.S. Provisional Patent Application No. 63/013,081, filed Apr. 21, 2020, the specification(s) of which are incorporated herein in their entirety by reference.

U.S. patent application Ser. No. 17/237,032 is also a continuation-in-part and claims benefit of U.S. patent application Ser. No. 16/779,622, filed Feb. 2, 2020, now U.S. Pat. No. 10,991,217, the specification(s) of which are incorporated herein in their entirety by reference.

BACKGROUND OF THE INVENTION

Thermal cameras allow for the measurement of the temperature of a particular object from a distance, which has a wide array of uses including in mines and factories for identifying surfaces with a dangerously high temperature. This prevents injuries to workers who would potentially be harmed by even coming near said surfaces. Handheld devices for indirect surface temperature measurement are currently implemented through the use of handheld devices. However, due to the size of the environments in which thermal cameras are most commonly implemented, a wide field-of-view (FoV) must be captured by one or more thermal cameras linked together. However, there is a tradeoff between FoV and image quality for thermal cameras, with high-quality cameras being more expensive and with a smaller FoV, and vice versa. Furthermore, the large number of cameras necessary to cover the entire environment may require a large number of wires, which may take up space or get tangled. Thus, there exists a present need for a thermal camera system able to achieve high accuracy and efficiency while minimizing the number of cameras and the number of wires connecting said cameras.

FIELD OF THE INVENTION

The present invention is directed to an algorithm allowing for efficient and accurate mapping of Red-Green-Blue (RGB) images to thermal images in a daisy chain of low-quality, wide field-of-view (FoV) devices.

BRIEF SUMMARY OF THE INVENTION

It is an objective of the present invention to provide systems and methods that allow for an algorithm allowing for efficient and accurate mapping of Red-Green-Blue (RGB) images to thermal images in a daisy chain of low-quality, wide field-of-view (FoV) devices, as specified in the independent claims. Embodiments of the invention are given in the dependent claims. Embodiments of the present invention can be freely combined with each other if they are not mutually exclusive.

In some embodiments, the present invention features a method for generating a one-to-one mapping of a first plurality of fiducials in a first image to a second plurality of fiducials in a second image such that the mapping accounts for one or more distortions of the first image, one or more distortions of the second image, or a combination thereof. In some embodiments, the first image may comprise a distorted Red-Green-Blue (RGB) image. In some embodiments, the second image may comprise a distorted thermal image. In some embodiments, the one or more distortions may comprise lens distortion, perspective distortion, or a combination thereof. In some embodiments, the first plurality of fiducials may be uniformly distributed across an area of the first image. In some embodiments, the second plurality of fiducials may be uniformly distributed across an area of the second image.

One of the unique and inventive technical features of the present invention is the implementation of a plurality of low-quality, wide field-of-view (FoV) thermal cameras arranged in a daisy chain formation. Without wishing to limit the invention to any theory or mechanism, it is believed that the technical feature of the present invention advantageously provides for increased resource efficiency, energy efficiency, and a reduction of wires required to capture a complete view of an environment with a plurality of thermal cameras. None of the presently known prior references or work has the unique inventive technical feature of the present invention.

Furthermore, the inventive technical features of the present invention contributed to a surprising result. For example, one skilled in the art would not implement a plurality of low-quality wide-FoV thermal cameras due to the image distortions resulting from the fisheye lens implemented in such thermal cameras, resulting in decreased energy efficiency due to the algorithms necessary to undistort and map the images into thermal data. The present invention implements a plurality of efficient un-distortion, mapping, and calibration algorithms for converting the distorted RGB images gathered from the cameras into useful thermal data. Surprisingly, this is a more resource-efficient and energy-efficient manner of thermal image capturing than the implementation of higher-quality thermal cameras. Thus, the inventive technical feature of the present invention contributed to a surprising result.

Any feature or combination of features described herein are included within the scope of the present invention provided that the features included in any such combination are not mutually inconsistent as will be apparent from the context, this specification, and the knowledge of one of ordinary skills in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Following is a list of elements corresponding to a particular element referred to herein:
- 100 thermal camera system
- 110 thermal cameras
- 120 base thermal camera
- 200 computing system The term "RGB image" is defined herein as a system representing the colors used on a digital display screen. Red, green, and blue can be combined in various proportions to obtain any color in the visible spectrum. The RGB model uses 8 bits each—from 0 to 23—for red, green, and blue colors. RGB can be used to represent a grayscale image from one or more of the spectral distributions encompassed by the R, G, B descriptions.

The term "fiducial" is defined herein as an object (digital or physical) placed in the field of view of an imaging system that appears in the image produced.

The term "corner fiducials" is defined herein as the element points of an array image in the 4 corners of said image.

The term "parabola" is defined herein as a plane curve that is mirror-symmetrical and is approximately U-shaped. Thus, a horizontal parabola is a curve that has a middle portion that is approximately horizontal, and a vertical parabola is a curve that has a middle portion that is approximately vertical.

The term "daisy chain" is defined herein as several devices connected together in a linear series.

Figure 1:
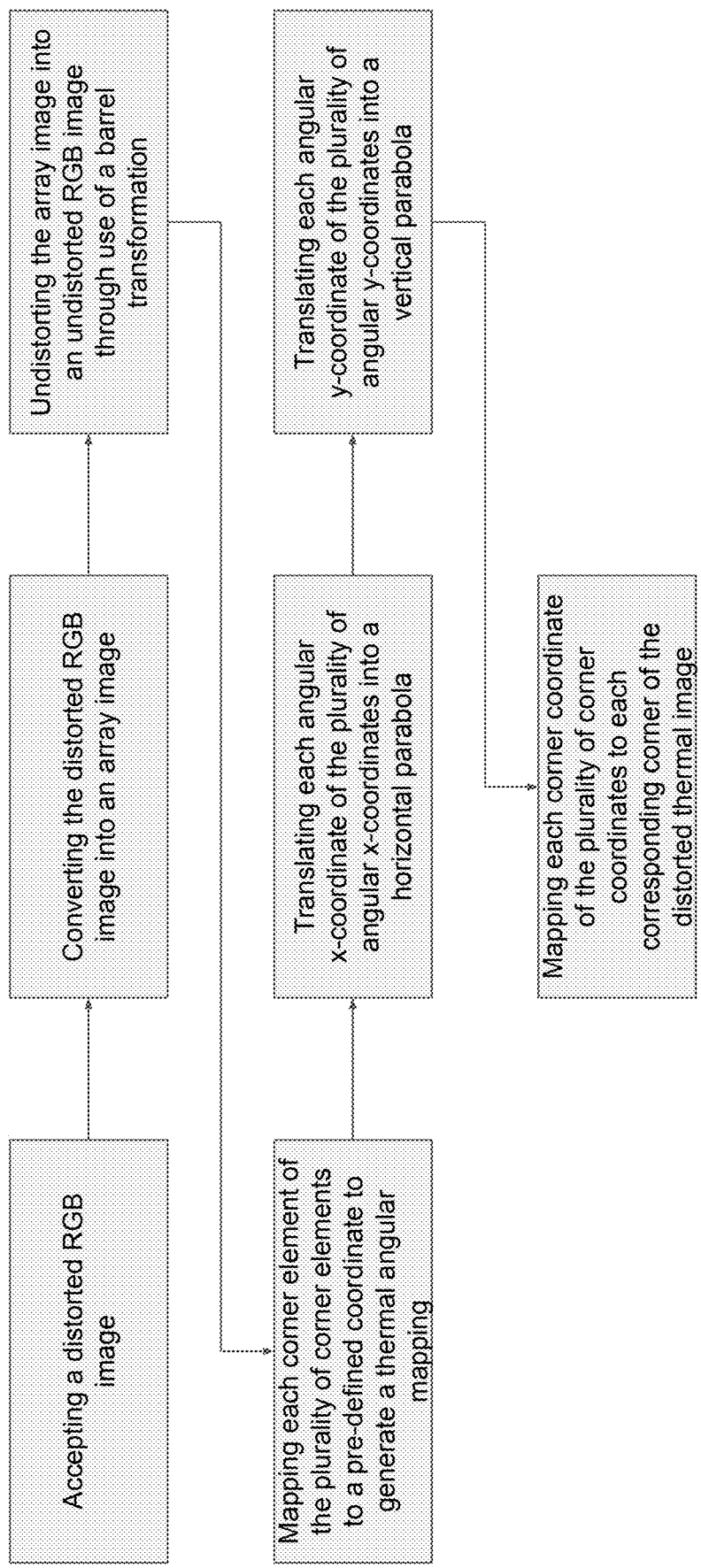
FIG. 1 shows a flow chart of a method for Red-Green-Blue (RGB) to thermal image mapping and calibration of the thermal camera system of the present invention.
Figure 2:
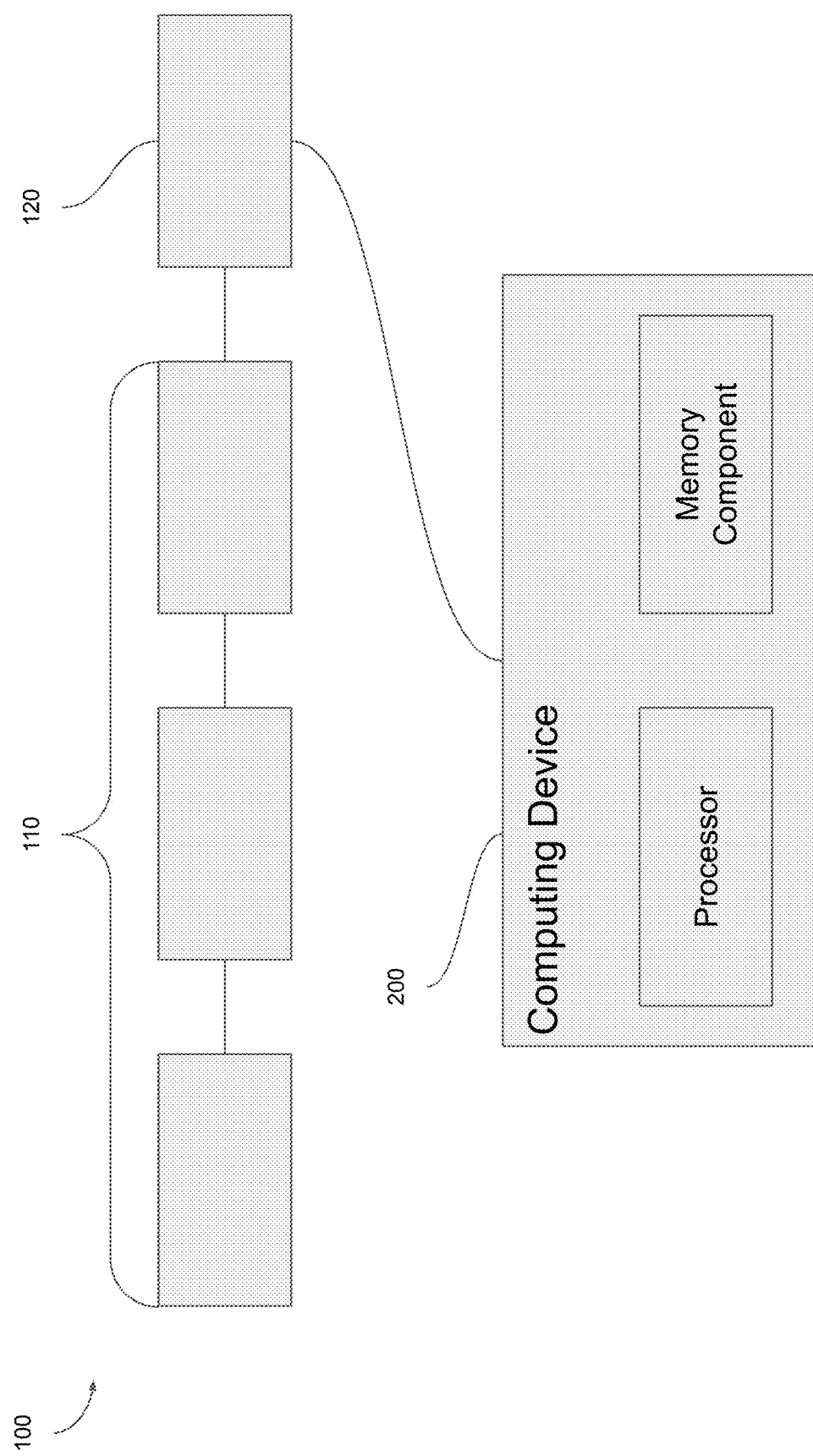
FIG. 2 shows a schematic of a system for Red-Green-Blue (RGB) to thermal image mapping and calibration of the thermal camera system of the present invention.
Figure 3:
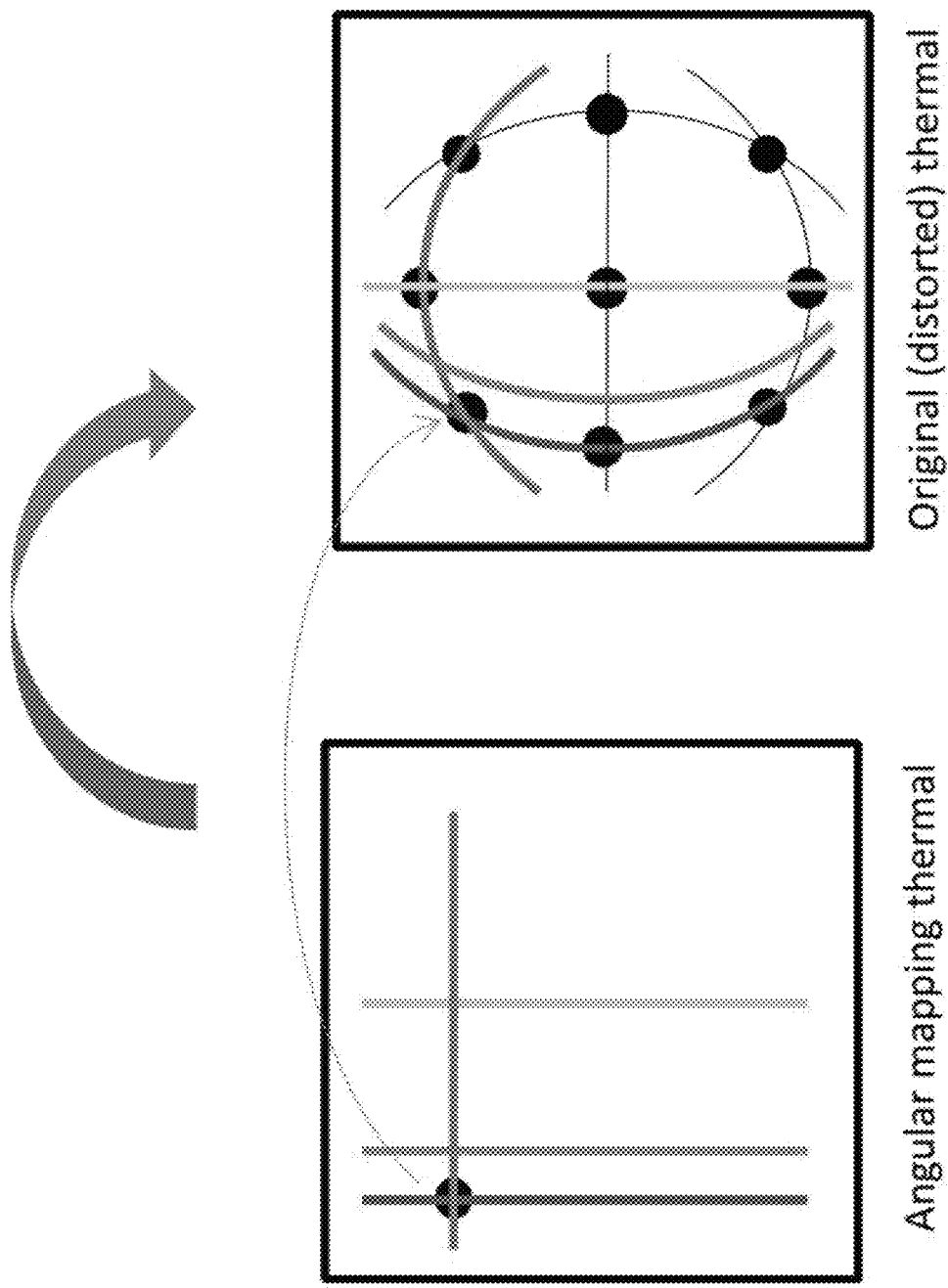
FIG. 3 shows an example of the hand-crafted 2nd-degree parabola algorithm implemented in the present invention.
Figure 4:
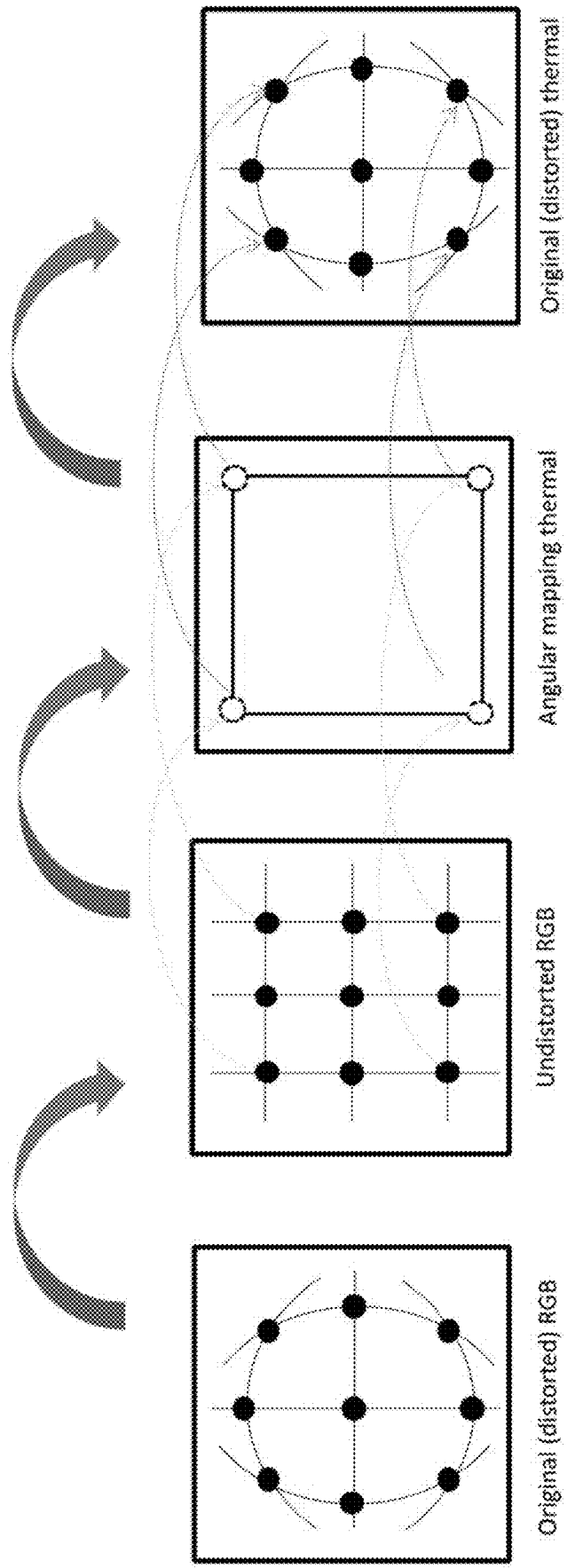
FIG. 4 shows a plurality of diagrams of the method for Red-Green-Blue (RGB) to thermal image mapping and calibration of the thermal camera system of the present invention.
Figure 5:
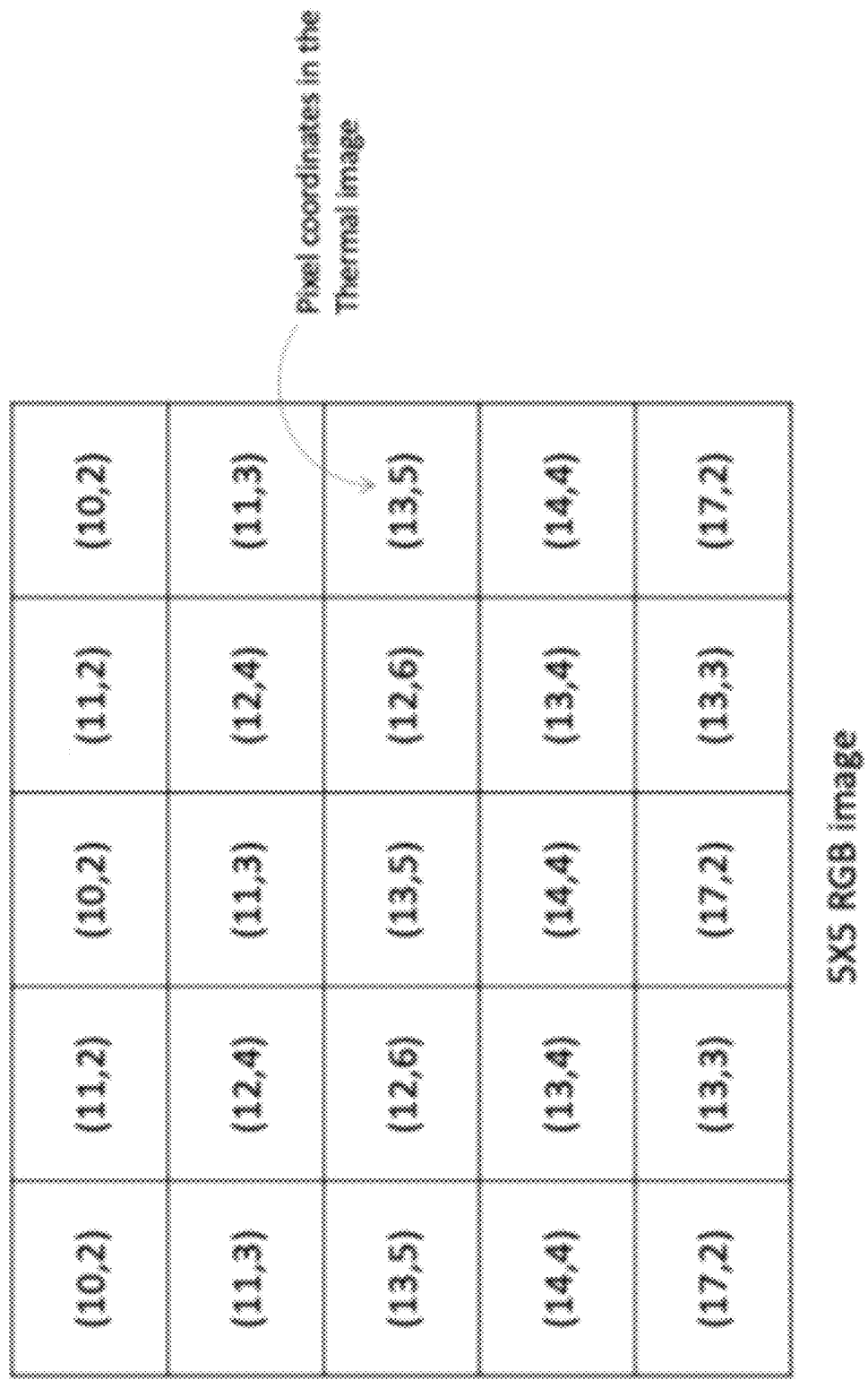
FIG. 5 shows an example of the output matrix implemented in the present invention.
Figure 6:
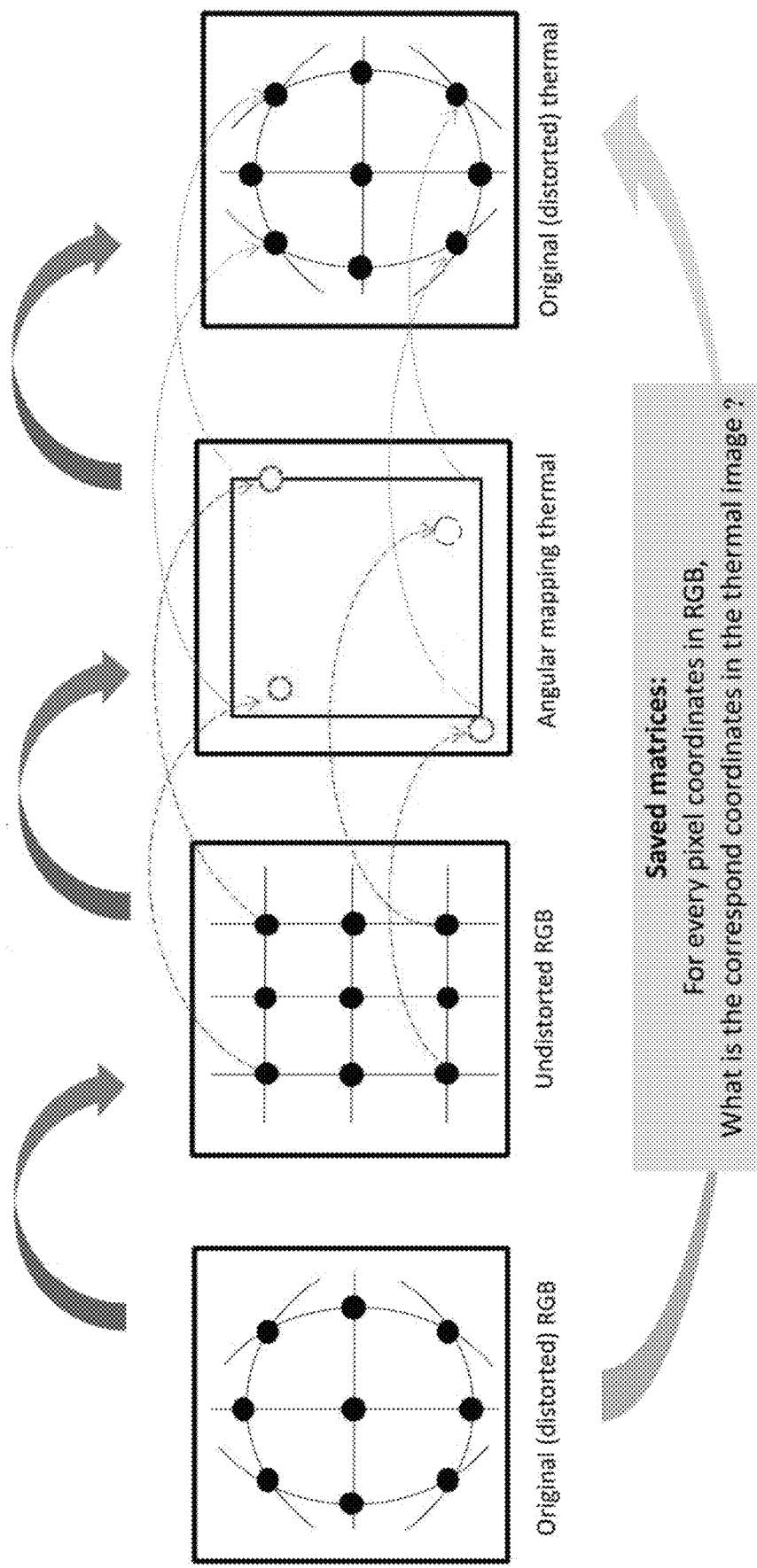
FIG. 6 shows a plurality of diagrams of the method for re-calibrating the thermal camera system of the present invention.

Referring now to FIGS. 1-2, the present invention features a method for generating a one-to-one mapping of a first plurality of fiducials in a first image to a second plurality of fiducials in a second image such that the mapping accounts for one or more distortions of the first image, one or more distortions of the second image, or a combination thereof. In some embodiments, the first image may comprise a distorted Red-Green-Blue (RGB) image. In some embodiments, the second image may comprise a distorted thermal image. In some embodiments, the one or more distortions may comprise lens distortion, perspective distortion, or a combination thereof. In some embodiments, the first plurality of fiducials may be uniformly distributed across an area of the first image. In some embodiments, the second plurality of fiducials may be uniformly distributed across an area of the second image.

In other embodiments, the present invention features a method for calibrating a mapping between Red-Green-Blue (RGB) images and thermal images. In some embodiments, the method may comprise accepting a distorted RGB image comprising a plurality of pixels and a plurality of RGB fiducials, and a distorted thermal image comprising a plurality of pixels and a plurality of thermal fiducials. The plurality of RGB fiducials may comprise a plurality of RGB corner fiducials. The plurality of thermal fiducials may comprise a plurality of thermal corner fiducials.

In some embodiments, the method may further comprise identifying, for each fiducial of the plurality of RGB fiducials and for each pixel of the plurality of pixels of the RGB image, an XY coordinate, and identifying, for each fiducial of the plurality of thermal fiducials and for each pixel of the plurality of pixels of the thermal image, an XY coordinate.

The method may further comprise applying a polynomial distortion transformation to the distorted RGB image to generate an undistorted RGB image such that the XY coordinates of the plurality of RGB fiducials and the plurality of pixels of the RGB image are transformed. The method may further comprise mapping the plurality of corner fiducials of the undistorted RGB image to a square mapping array comprising the plurality of RGB fiducials by an affine transformation such that the XY coordinates of the plurality of RGB fiducials and the plurality of pixels of the RGB image are transformed.

In some embodiments, the method may further comprise projecting a plurality of horizontal parabolas and a plurality of vertical parabolas from the plurality of RGB fiducials of the square mapping array to the plurality of thermal fiducials of the distorted thermal image such that intersections between the plurality of horizontal parabolas and the plurality of vertical parabolas line up with the XY coordinates of the plurality of thermal fiducials. The method may further comprise establishing, based on the plurality of horizontal parabolas and the plurality of vertical parabolas, a one-to-one mapping between the plurality of RGB fiducials of the distorted RGB image and the plurality of thermal fiducials. The method may further comprise establishing, based on the one-to-one mapping between the XY coordinates of the plurality of RGB fiducials of the distorted RGB image and the XY coordinates of the plurality of thermal fiducials, a one-to-one mapping between the XY coordinates of the plurality of pixels of the RGB image and the XY coordinates of the plurality of pixels of the thermal image.

In some embodiments, the polynomial distortion transformation may comprise a barrel transformation. In some embodiments, the plurality of RGB fiducials may be uniformly distributed across an area of the distorted RGB image. In some embodiments, the plurality of thermal fiducials may be uniformly distributed across an area of the distorted thermal image. In some embodiments, the plurality of RGB fiducials may comprise 4 to 25 fiducials. In some embodiments, the plurality of thermal fiducials may comprise an equal amount of fiducials as the plurality of RGB fiducials.

In some embodiments, the method may further comprise accepting a new distorted RGB image comprising a plurality of pixels, each pixel having an XY coordinate, accepting a new distorted thermal image comprising a plurality of pixels, each pixel having an XY coordinate, and mapping, based on the one-to-one mapping between the XY coordinates of the plurality of pixels of the RGB image and the XY coordinates of the plurality of pixels of the thermal image, the XY coordinates of the plurality of pixels of the new distorted RGB image and the XY coordinates of the plurality of pixels of the new distorted thermal image. In some embodiments, the one-to-one mapping between the plurality of pixels of the RGB image and the plurality of pixels of the thermal image may comprise a lookup table.

The present invention features a system configured for Red-Green-Blue (RGB) to thermal image mapping and calibration of a thermal camera. In some embodiments, the system may comprise a thermal camera system (100) comprising a base thermal camera (120) and at least one thermal camera arranged in a daisy chain formation, configured to take a distorted RGB image comprising a plurality of pixels and a plurality of RGB fiducials, and a distorted thermal image comprising a plurality of pixels and a plurality of thermal fiducials.

The system may further comprise a computing device (200) operatively coupled to the plurality of thermal cameras (110). The device (200) may comprise a processor configured to execute computer-readable instructions, and a memory component comprising computer-readable instructions. In some embodiments, the computer-readable instructions may comprise accepting the distorted RGB image and the distorted thermal image. The plurality of RGB fiducials may comprise a plurality of RGB corner fiducials. The plurality of thermal fiducials may comprise a plurality of thermal corner fiducials.

The computer-readable instructions may further comprise identifying, for each fiducial of the plurality of RGB fiducials and for each pixel of the plurality of pixels of the RGB image, an XY coordinate, identifying, for each fiducial of the plurality of thermal fiducials and for each pixel of the plurality of pixels of the thermal image, an XY coordinate, and applying a polynomial distortion transformation to the distorted RGB image to generate an undistorted RGB image such that the XY coordinates of the plurality of RGB fiducials and the plurality of pixels of the RGB image are transformed.

The computer-readable instructions may further comprise mapping the plurality of corner fiducials of the undistorted RGB image to a square mapping array comprising the plurality of RGB fiducials by an affine transformation such that the XY coordinates of the plurality of RGB fiducials and the plurality of pixels of the RGB image are transformed. The computer-readable instructions may further comprise projecting a plurality of horizontal parabolas and a plurality of vertical parabolas from the plurality of RGB fiducials of the square mapping array to the plurality of thermal fiducials of the distorted thermal image such that intersections between the plurality of horizontal parabolas and the plurality of vertical parabolas line up with the XY coordinates of the plurality of thermal fiducials.

The computer-readable instructions may further comprise establishing, based on the plurality of horizontal parabolas and the plurality of vertical parabolas, a one-to-one mapping between the plurality of RGB fiducials of the distorted RGB image and the plurality of thermal fiducials. The computer-readable instructions may further comprise establishing, based on the one-to-one mapping between the XY coordinates of the plurality of RGB fiducials of the distorted RGB image and the XY coordinates of the plurality of thermal fiducials, a one-to-one mapping between the XY coordinates of the plurality of pixels of the RGB image and the XY coordinates of the plurality of pixels of the thermal image.

In some embodiments, the thermal camera system (100) may comprise a base camera (120) and at least one thermal camera daisy-chained to the base camera (120). In some embodiments, each thermal camera, including the base camera (120), may be configured to take a distorted RGB image and a distorted thermal image. The distorted RGB image and the distorted thermal image may be of the same scene for each camera. In some embodiments, all images taken by the at least one thermal camera may be transmitted up the daisy chain to the base camera (120), and then to the computing device (200).

In some embodiments, the polynomial distortion transformation may comprise a barrel transformation. In some embodiments, the plurality of RGB fiducials may be uniformly distributed across an area of the distorted RGB image. In some embodiments, the plurality of thermal fiducials may be uniformly distributed across an area of the distorted thermal image. In some embodiments, the plurality of RGB fiducials may comprise 4 to 25 fiducials. In some embodiments, the plurality of thermal fiducials may comprise an equal amount of fiducials as the plurality RGB fiducials.

In some embodiments, the computer-readable instructions may further comprise accepting a new distorted RGB image comprising a plurality of pixels, each pixel having an XY coordinate, accepting a new distorted thermal image comprising a plurality of pixels, each pixel having an XY coordinate, and mapping, based on the one-to-one mapping between the XY coordinates of the plurality of pixels of the RGB image and the XY coordinates of the plurality of pixels of the thermal image, the XY coordinates of the plurality of pixels of the new distorted RGB image and the XY coordinates of the plurality of pixels of the new distorted thermal image. In some embodiments, the one-to-one mapping between the plurality of pixels of the RGB image and the plurality of pixels of the thermal image comprises a lookup table.

In some embodiments, the thermal camera system may comprise two to fifty thermal cameras daisy-chained together, originating from the base camera. In some embodiments, one or more thermal sensors of the plurality of thermal sensors may comprise the capability of measuring an acoustic signal as well as a thermal signature. The one or more thermal sensors may comprise an acoustic sensor, such as a directional microphone. The memory component of the computing device of the present invention may further comprise computer-readable instructions for accepting the acoustic signal from the acoustic sensor, measuring the acoustic signal, and determining a region of origin of the acoustic signal in the image captured by the thermal camera.

In some embodiments, the fiducials may comprise a physical object in view of the base camera (120), each camera of the at least one camera, or a combination thereof (e.g. a radiofrequency tag). In some embodiments, the fiducials may comprise a digital object placed in the images obtained from the thermal camera system (100) by each thermal camera, the computing device (200), or a combination thereof.

In some embodiments, the lookup table of the present invention comprises a list of XY coordinates mapped 1:1 to another list of XY coordinates. Thus, when a new distorted RGB image is accepted by the computing device (200), the lookup table may be used to associate every pixel of the distorted RGB image with every pixel of the distorted thermal image.

In some embodiments, the initial calibration process (for some types of RGB and thermal sensors) comprises calculating a "Barrel transformation" for undistorting the RGB image. This transformation is calculated once for a given type of RGB lens, and not being modified during any potential re-calibration. Calculating this transformation requires at least a 9-points element array image. The process may further comprise creating a mapping from the undistorted RGB image to a thermal angular mapping, using a perspective geometrical transformation. This transformation may comprise mapping each of the RGB array-corner-element into a predefined coordinate: [±100, ±100] (the value 100 has no physical meaning). The thermal angular mapping is then mapped into the distorted (original, scaled by ×10) thermal image using a unique 2nd-degree parabolic mapping.

The aforementioned Barrel transformation may be a method of reversing Barrel distortion in an image, which is a type of distortion wherein lines that are straight in real life appear to curve inwards (like the walls of a barrel). Thus, the Barrel transformation straightens the curved lines into a grid of straight lines.

At the end of the process, for each RGB coordinate, the respective thermal coordinate is calculated. Thus, the output matrix saves for every RGB coordinate where are the thermal coordinates for this location. During an evaluation, for every new thermal image, the data is mapped using the coordinates from the matrix, and the data is taken from the new thermal frame.

In some embodiments, a thermal camera may comprise a lens, a thermal sensor, processing electronics, and a mechanical housing. The thermal sensor may comprise Negative Temperature Coefficient (NTC) thermistors, Resistance Temperature Detectors (RTDs) thermocouples, semiconductor-based sensors, or a combination thereof. The thermal camera may further comprise communication components, configured to transmit the output of the thermal sensor to an external source after being processed by the processing electronics. In the present invention, this external source comprises another thermal camera, a base thermal camera, or, in the case of the base thermal camera, the computing system. Due to the daisy-chain arrangement of the thermal cameras in the present invention, the communication components of each thermal camera allow for said camera to receive the aggregated signal from a connected sensor as input, and output the aggregated signal combined with the individual output of the camera itself to the next camera in the chain.

The computer system can include a desktop computer, a workstation computer, a laptop computer, a netbook computer, a tablet, a handheld computer (including a smartphone), a server, a supercomputer, a wearable computer (including a SmartWatch™), or the like and can include digital electronic circuitry, firmware, hardware, memory, a computer storage medium, a computer program, a processor (including a programmed processor), an imaging apparatus, wired/wireless communication components, or the like. The computing system may include a desktop computer with a screen, a tower, and components to connect the two. The tower can store digital images, numerical data, text data, or any other kind of data in binary form, hexadecimal form, octal form, or any other data format in the memory component. The data/images can also be stored in a server communicatively coupled to the computer system. The images can also be divided into a matrix of pixels, known as a bitmap that indicates a color for each pixel along the horizontal axis and the vertical axis. The pixels can include a digital value of one or more bits, defined by the bit depth. Each pixel may comprise three values, each value corresponding to a major color component (red, green, and blue). The size of each pixel in data can range from 8 bits to 24 bits. The network or a direct connection interconnects the imaging apparatus and the computer system.

The term "processor" encompasses all kinds of apparatus, devices, and machines for processing data, including by way of example a programmable microprocessor, a microcontroller comprising a microprocessor and a memory component, an embedded processor, a digital signal processor, a media processor, a computer, a system on a chip, or multiple ones, or combinations, of the foregoing. The apparatus can include special-purpose logic circuitry, e.g., an FPGA (field programmable gate array) or an ASIC (application-specific integrated circuit). Logic circuitry may comprise multiplexers, registers, arithmetic logic units (ALUs), computer memory, look-up tables, flip-flops (FF), wires, input blocks, output blocks, read-only memory, randomly accessible memory, electronically-erasable programmable read-only memory, flash memory, discrete gate or transistor logic, discrete hardware components, or any combination thereof. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, a data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, drives, or other storage devices). The operations described in this specification can be implemented as operations performed by a data processing apparatus on data stored on one or more computer-readable storage devices or received from other sources.

Program code embodied on a computer-readable medium may be transmitted using any appropriate medium, including but not limited to wireless, wireline, optical fiber cable, R.F, Bluetooth, storage media, computer buses, etc., or any suitable combination of the foregoing. Computer program code for carrying out operations for aspects of the present disclosure may be written in any combination of one or more programming languages, including an object-oriented programming language such as Java, Smalltalk, C #, Ruby, or the like, conventional procedural programming languages, such as Pascal, FORTRAN, BASIC, or similar programming languages, programming languages that have both object-oriented and procedural aspects, such as the "C" programming language, C++, Python, or the like, conventional functional programming languages such as Scheme, Common Lisp, Elixir, or the like, conventional scripting programming languages such as PHP, Perl, Javascript, or the like, or conventional logic programming languages such as PROLOG, ASAP, Datalog, or the like.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user.

Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft® Windows Powershell that employs object-oriented type programming architectures such as the Microsoft®.NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation®, a SPARC processor made by Sun Microsystems®, an Athlon, Sempron, Phenom, or Opteron processor made by AMD Corporation®, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft® Corporation; the Mac OS X operating system from Apple Computer Corp.®; a Unix® or Linux®-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

Connecting components may be properly termed as computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method for generating a one-to-one mapping of a plurality of Red-Green-Blue (RGB) fiducials in a RGB image to a plurality of thermal fiducials in a thermal image such that the mapping accounts for one or more distortions of the RGB image, one or more distortions of the thermal image, or a combination thereof, wherein the plurality of RGB fiducials are uniformly distributed across an area of the RGB image, wherein the plurality of thermal fiducials are uniformly distributed across an area of the thermal image.

2. A method for calibrating a mapping between Red-Green-Blue (RGB) images and thermal images, the method comprising:
   a. accepting a distorted RGB image comprising a plurality of pixels and a plurality of RGB fiducials, and a distorted thermal image comprising a plurality of pixels and a plurality of thermal fiducials;
      wherein the plurality of RGB fiducials comprise a plurality of RGB corner fiducials;
      wherein the plurality of thermal fiducials comprise a plurality of thermal corner fiducials;
   b. identifying, for each fiducial of the plurality of RGB fiducials and for each pixel of the plurality of pixels of the RGB image, an XY coordinate;
   c. identifying, for each fiducial of the plurality of thermal fiducials and for each pixel of the plurality of pixels of the thermal image, an XY coordinate;
   d. applying a polynomial distortion transformation to the distorted RGB image to generate an undistorted RGB image such that the XY coordinates of the plurality of RGB fiducials and the plurality of pixels of the RGB image are transformed;
   e. mapping the plurality of corner fiducials of the undistorted RGB image to a square mapping array comprising the plurality of RGB fiducials by an affine transformation such that the XY coordinates of the plurality of RGB fiducials and the plurality of pixels of the RGB image are transformed;
   f. projecting a plurality of horizontal parabolas and a plurality of vertical parabolas from the plurality of RGB fiducials of the square mapping array to the plurality of thermal fiducials of the distorted thermal image such that intersections between the plurality of horizontal parabolas and the plurality of vertical parabolas line up with the XY coordinates of the plurality of thermal fiducials;
   g. establishing, based on the plurality of horizontal parabolas and the plurality of vertical parabolas, a one-to-one mapping between the plurality of RGB fiducials of the distorted RGB image and the plurality of thermal fiducials; and
   h. establishing, based on the one-to-one mapping between the XY coordinates of the plurality of RGB fiducials of the distorted RGB image and the XY coordinates of the plurality of thermal fiducials, a one-to-one mapping between the XY coordinates of the plurality of pixels of the RGB image and the XY coordinates of the plurality of pixels of the thermal image.

3. The method of claim 2, wherein the polynomial distortion transformation comprises a barrel transformation.

4. The method of claim 2, wherein the plurality of RGB fiducials are uniformly distributed across an area of the distorted RGB image, wherein the plurality of thermal fiducials are uniformly distributed across an area of the distorted thermal image.

5. The method of claim 2, wherein the plurality of RGB fiducials comprise 4 to 25 fiducials.

6. The method of claim 5, wherein the plurality of thermal fiducials comprise an equal amount of fiducials as the plurality RGB fiducials.

7. The method of claim 2 further comprising:
   a. accepting a new distorted RGB image comprising a plurality of pixels, each pixel having an XY coordinate;
   b. accepting a new distorted thermal image comprising a plurality of pixels, each pixel having an XY coordinate; and
   c. mapping, based on the one-to-one mapping between the XY coordinates of the plurality of pixels of the RGB image and the XY coordinates of the plurality of pixels of the thermal image, the XY coordinates of the plurality of pixels of the new distorted RGB image and the XY coordinates of the plurality of pixels of the new distorted thermal image.

8. The method of claim 2, wherein the one-to-one mapping between the plurality of pixels of the RGB image and the plurality of pixels of the thermal image comprises a lookup table.

9. A system configured for Red-Green-Blue (RGB) to thermal image mapping and calibration of a thermal camera, the system comprising:
   a. a thermal camera system (100) comprising a base thermal camera (120) and at least one thermal camera arranged in a daisy chain formation, configured to take a distorted RGB image comprising a plurality of pixels and a plurality of RGB fiducials, and a distorted thermal image comprising a plurality of pixels and a plurality of thermal fiducials;
   b. a computing device (200) operatively coupled to the thermal camera system (100), the device (200) comprising:
      i. a processor configured to execute computer-readable instructions; and
      ii. a memory component comprising computer-readable instructions for:
         A. accepting the distorted RGB image and the distorted thermal image;
            wherein the plurality of RGB fiducials comprise a plurality of RGB corner fiducials;
            wherein the plurality of thermal fiducials comprise a plurality of thermal corner fiducials;
         B. identifying, for each fiducial of the plurality of RGB fiducials and for each pixel of the plurality of pixels of the RGB image, an XY coordinate;
         C. identifying, for each fiducial of the plurality of thermal fiducials and for each pixel of the plurality of pixels of the thermal image, an XY coordinate;
         D. applying a polynomial distortion transformation to the distorted RGB image to generate an undistorted RGB image such that the XY coordinates of the plurality of RGB fiducials and the plurality of pixels of the RGB image are transformed;
         E. mapping the plurality of corner fiducials of the undistorted RGB image to a square mapping array comprising the plurality of RGB fiducials by an affine transformation such that the XY coordinates of the plurality of RGB fiducials and the plurality of pixels of the RGB image are transformed;
         F. projecting a plurality of horizontal parabolas and a plurality of vertical parabolas from the plurality of RGB fiducials of the square mapping array to the plurality of thermal fiducials of the distorted thermal image such that intersections between the plurality of horizontal parabolas and the plurality of vertical parabolas line up with the XY coordinates of the plurality of thermal fiducials;
         G. establishing, based on the plurality of horizontal parabolas and the plurality of vertical parabolas, a one-to-one mapping between the plurality of RGB fiducials of the distorted RGB image and the plurality of thermal fiducials; and
         H. establishing, based on the one-to-one mapping between the XY coordinates of the plurality of RGB fiducials of the distorted RGB image and the XY coordinates of the plurality of thermal fiducials, a one-to-one mapping between the XY coordinates of the plurality of pixels of the RGB image and the XY coordinates of the plurality of pixels of the thermal image.

10. The system (200) of claim 9, wherein the polynomial distortion transformation comprises a barrel transformation.

11. The system (200) of claim 9, wherein the plurality of RGB fiducials are uniformly distributed across an area of the distorted RGB image, wherein the plurality of thermal fiducials are uniformly distributed across an area of the distorted thermal image.

12. The system (200) of claim 9, wherein the plurality of RGB fiducials comprise 4 to 25 fiducials.

13. The system (200) of claim 9, wherein the plurality of thermal fiducials comprise an equal amount of fiducials as the plurality RGB fiducials.

14. The system (200) of claim 9, wherein the computer-readable instructions further comprise:
   a. accepting a new distorted RGB image comprising a plurality of pixels, each pixel having an XY coordinate;
   b. accepting a new distorted thermal image comprising a plurality of pixels, each pixel having an XY coordinate; and
   c. mapping, based on the one-to-one mapping between the XY coordinates of the plurality of pixels of the RGB image and the XY coordinates of the plurality of pixels of the thermal image, the XY coordinates of the plurality of pixels of the new distorted RGB image and the XY coordinates of the plurality of pixels of the new distorted thermal image.

15. The system (200) of claim 9, wherein the one-to-one mapping between the plurality of pixels of the RGB image and the plurality of pixels of the thermal image comprises a lookup table.

* * * * *